H. G. CARLSON.
METHOD OF MAKING THE FEMALE MEMBER OF A UNION COUPLING
APPLICATION FILED FEB. 17, 1913.
1,172,428.
Patented Feb. 22, 1916.
2 SHEETS—SHEET 1.
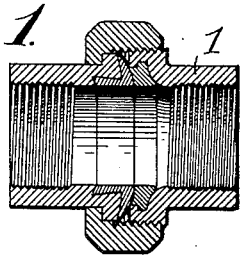
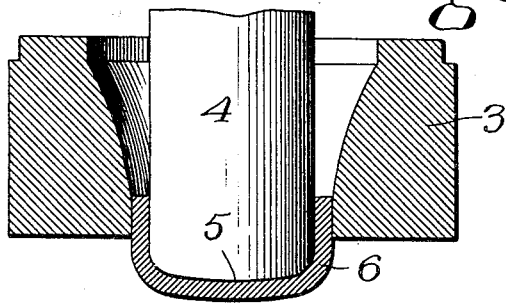
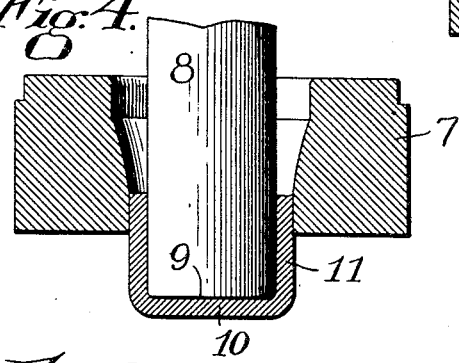
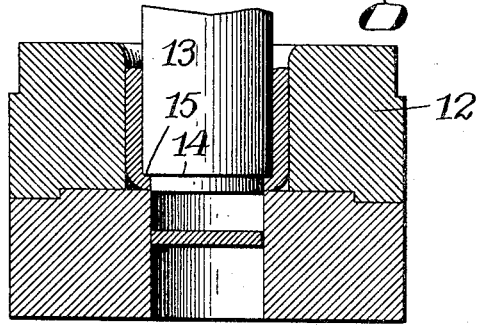
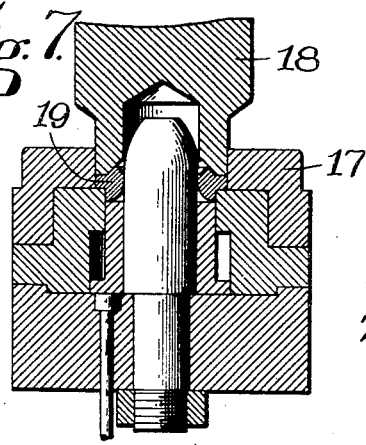
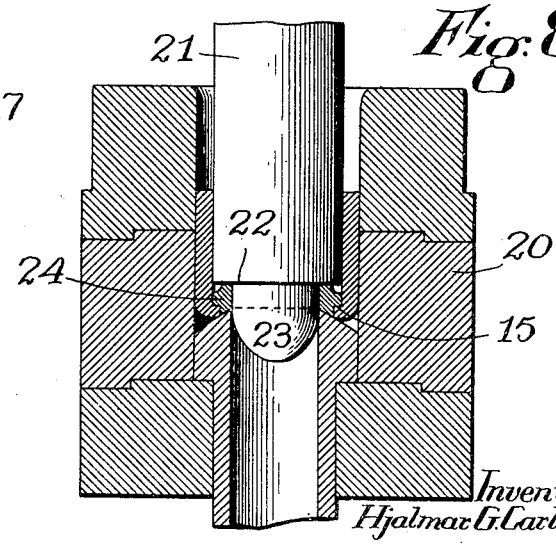
Witnesses.
R. D. Tolman.
Penelope Cumberbach.
Inventor
Hjalmar G. Carlson
By Ralph E. Atherton.
Attorney

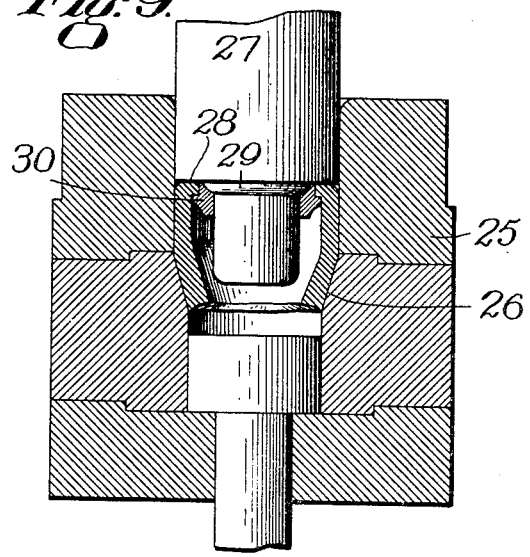
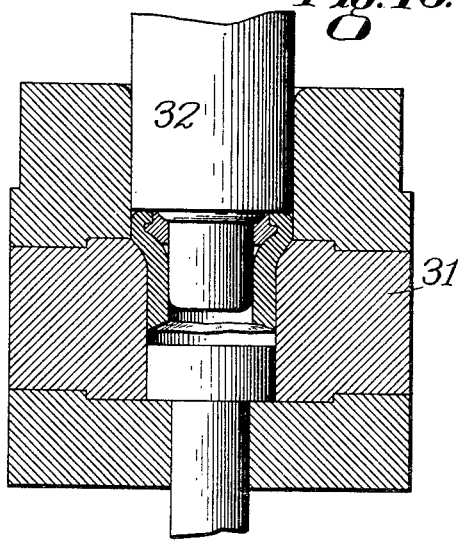
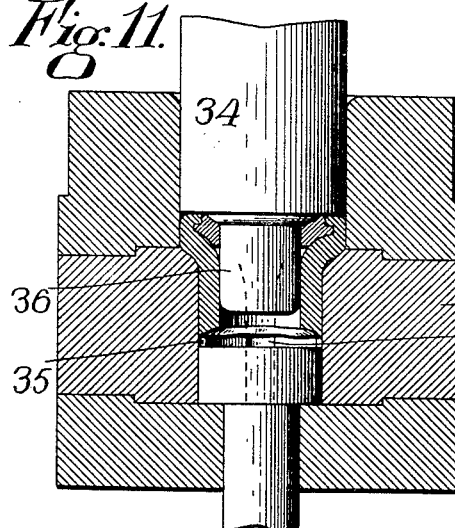
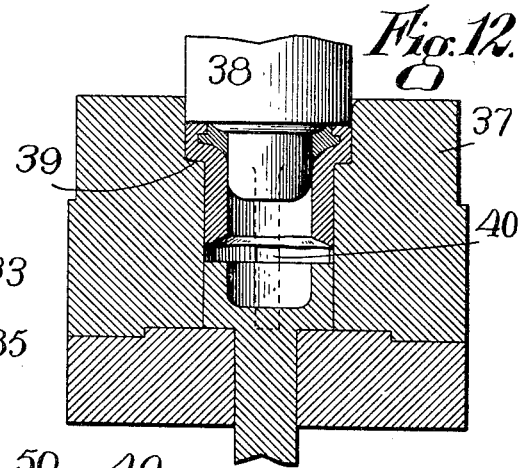
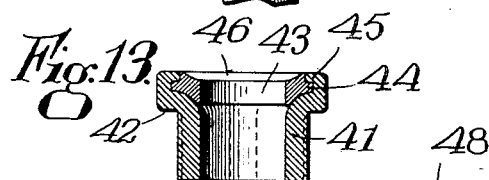
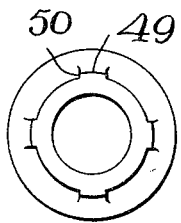
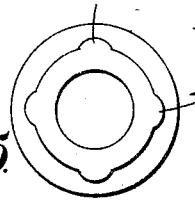

UNITED STATES PATENT OFFICE.

HJALMAR G. CARLSON, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS.

METHOD OF MAKING THE FEMALE MEMBER OF A UNION-COUPLING.

1,172,428. Specification of Letters Patent. Patented Feb. 22, 1916.

Application filed February 17, 1913. Serial No. 748,798.

*To all whom it may concern:*

Be it known that I, HJALMAR G. CARLSON, a citizen of the United States, residing at Worcester, in the county of Worcester and Commonwealth of Massachusetts, have invented a new and useful Improvement in Methods of Making the Female Member of a Union-Coupling, accompanied by drawings forming a part of the same and illustrating the several steps in the process of forming the female member of the union coupling in accordance with my invention.

The present invention relates to a method of constructing the female member of a union coupling of sheet metal, and provided with a brass or other noncorrosive bushing.

Figure 1 represents in central, sectional view a union coupling comprising a female member constructed in accordance with my improved process. Fig. 2 represents a circular disk from which the body portion of the female member of the coupling is formed. Fig. 3 represents a punch and die for completing the first step in my improved process. Fig. 4 represents a punch and die employed in the second step of my improved process. Fig. 5 represents a punch and die for forming a concentric hole in the closed end of a cup shaped blank, said punch having a shoulder for forming an interior right angled shoulder in the blank. Fig. 6 represents an annular blank from which a noncorrosive bushing is formed, preferably of brass. Fig. 7 represents a punch and die for shaping an annular blank represented in Fig. 6 into the form of a bushing adapted to be inserted in the blank as formed by the punch and die represented in Fig. 5. Fig. 8 represents a retaining die for supporting the blank and having an annular convex bottom and a coöperating punch for forcing the bushing into position. Fig. 9 represents a die contracted at its lower portion for compressing one end of the blank and reducing its diameter by means of a reciprocating punch, the punch having a bead on its under surface for concaving the bushing. Fig. 10 represents a punch and die for still further compressing the blank and inclosing the noncorrosive bushing. Fig. 11 shows a similar punch and die for still further compressing the blank and inclosing the noncorrosive bushing and also adapted by means of recesses in the die for forming a series of ribs upon the outer side of the blank. Fig. 12 represents a punch and die for forming a right angled shoulder upon the outside of the blank and for compressing the outer ribs of the blank in width. Fig. 13 is a detached view of the female member of the coupling as it is finally formed by the punch and die represented in Fig. 12. Fig. 14 is a view of the completed female member of the coupling being in the same form as represented in Fig. 13, with the addition of an internal screw thread. Fig. 15 represents an end view of the blank as it is shaped in the punch and die represented in Fig. 11 and having a series of external ribs, in the present instance four in number. Fig. 16 is an end view of the female member of the coupling as it is formed by the punch and die represented in Fig. 12, having its exterior ribs compressed in width to form right angled shoulders.

Similar reference characters refer to similar parts in the different views.

The present invention relates to a method of forming the female member of a union coupling from sheet metal and having inclosed therein a noncorrosive bushing, such as that shown at 1, Fig. 1. In carrying my improved method into practice I first form a cup shaped blank from a circular disk of sheet metal 2, Fig. 2, by means of a die 3 and a reciprocating cylindrical punch 4, having its lower end slightly rounded, as shown at 5, Fig. 3. The cup shaped blank, when completed, is represented at 6, Fig. 3. The cup shaped blank 6, is then forced through a die 7 by means of a reciprocating cylindrical punch 8, having its lower end 9 at right angles to its axis, whereby the blank is still further compressed in diameter, and its closed end 10 brought at right angles to its sides. The form of the blank is shown in sectional view at 11, Fig. 4. The blank 11 is next placed in a retaining die 12, and a concentric hole is formed in its closed end by a reciprocating punch 13, having a shoulder 14, by which a right angled shoulder 15 is formed in the interior of the blank.

Fig. 6 represents an annular blank 16 of some non-corrosive metal, such as brass. Fig. 7 represents a die 17 and a punch 18, suitably shaped to upset the annular blank 16 into the shape shown at 19, Fig. 7, adapted to form the non-corrosive bushing inclosed in the female member of the coupling. The bushing as shaped by the punch and die in Fig. 7 is next inserted within the blank formed by the punch and die in Fig. 5 by means of a retaining die 20 and a reciprocating punch 21, having a shoulder 22 and an extension 23 of less diameter than the punch, said extension straightening the inner edge of the bushing, and the shoulder 22 forcing it downward against the right angled shoulder 15 of the blank, the bushing then being represented at 24, Fig. 8.

The blank with the bushing inserted therein is then taken from the die 20 and forced into a die 25, Fig. 9, said die being contracted at its lower portion in order to compress the lower end of the blank, as shown at 26, Fig. 9. The blank is forced into the die by a reciprocating punch 27, having a shoulder 28 which forces the blank and its applied bushing downward, and also having beneath the shoulder 28 a convex bead 29 for forming a concave surface on the bushing, as represented at 30, Fig. 9.

The further compression and inclosure of the blank is accomplished by means of a die 31 and punch 32, and by a die 33 and punch 34, as represented in Figs. 10 and 11. In Fig. 11 the die 33 is provided with recesses, as shown at 35, by which peripheral longitudinal ribs are formed on the blank as it is forced downward into the die 33 by means of the extension 36 on the end of the punch 34. The blank as taken from the die 33 is then forced into a die 37 by a punch 38, said die being suitably shaped to form a right angled shoulder 39 on the outside of the blank. The die 37 is provided with longitudinal recesses 40, similar to the recesses 35 on the die 33, but of less width, causing the longitudinal ribs on the blank as formed in the die 33 to be compressed in width, forming right angled shoulders adapted to be engaged by a wrench. The completed blank, as shaped in Fig. 12, is represented in Fig. 13, consisting of a sheet metal body 41, having right angled shoulders 42, a bushing of noncorrosive metal 43 provided with a rib 44 entering an annular recess 45 in the body portion of the female member, said bushing having a concave surface 46 adapted to contact with a corresponding convex surface in the male member of the coupling. The female member is then completed by forming an interior screw thread 47 and an exterior screw thread 47ª, as shown in Fig. 14. In Fig. 15, I have shown an end view of the female member which represents the outer longitudinal ribs 48, as they are formed by the recesses in the die 33, Fig. 11, and in Fig. 16 I have shown an end view representing the ribs 49, as compressed in width by the recesses 40 in the die 37, said ribs forming with the cylindrical surface of the female member right angled shoulders 50 adapted to be engaged by a wrench.

I claim,

The herein described method of forming the female member of a union coupling, comprising forming a cup shaped blank, forming an opening in the closed end of the blank smaller than the internal diameter of the blank, thereby producing an inturned annular flange surrounding said opening, inserting a bushing against the inner side of said flange and reducing the internal diameter of the blank to inclose said bushing between said shoulder and the wall of the blank.

Dated this 13th day of February, 1913.

HJALMAR G. CARLSON.

Witnesses:
 PENELOPE COMBERBACH,
 NELLIE WHALEN.